May 22, 1951 H. H. DRUMM 2,553,641
AIRCRAFT CABLE LOCK

Filed Sept. 26, 1946 2 Sheets-Sheet 1

INVENTOR.
HENRY H. DRUMM
BY Richard W. Treverton
ATTORNEY

May 22, 1951  H. H. DRUMM  2,553,641
AIRCRAFT CABLE LOCK

Filed Sept. 26, 1946  2 Sheets-Sheet 2

INVENTOR.
HENRY H. DRUMM
BY Richard W. Treverton
ATTORNEY

Patented May 22, 1951

2,553,641

UNITED STATES PATENT OFFICE 2,553,641

AIRCRAFT CABLE LOCK

Henry H. Drumm, Ferguson, Mo., assignor to Curtiss-Wright Corporation, a corporation of Delaware Application September 26, 1946, Serial No. 699,549

7 Claims. (Cl. 74—501)

The present invention relates to means for locking aircraft controls or the like and has particular reference to means, applicable to a cable or link system for operating an aircraft control surface, whereby the system may be locked to hold such surface against movement by air gusts when the aircraft is on the ground.

The locking device comprises a simple and compact unit attachable to an aircraft structure at any desired point along the control system, and connected to the control system by flexible cables that are slack during normal operation of the controls so as not to interfere with such operation. Upon application of the lock, the cables tighten and in so doing move the related control surface to the predetermined position thereof desired when the aircraft is on the ground, usually the neutral position. The device is operated between locked and unlocked positions by simply turning a rotatable member through somewhat less than one full turn, which preferably is effected by a remote control means located in the aircraft control cabin.

Application and release of the lock means, depending upon angular movement of the rotatable member, can occur anywhere within relatively wide angular limits, so that adjustment of the cable lengths and the positioning of other parts is not critical, and the movements of the lock operating means may vary considerably without detracting from the effectiveness of the lock or the complete release of the lock.

The foregoing and other objects and advantages will appear from the following description of the typical embodiment of the invention shown in the accompanying drawings, wherein.

Figure 1:
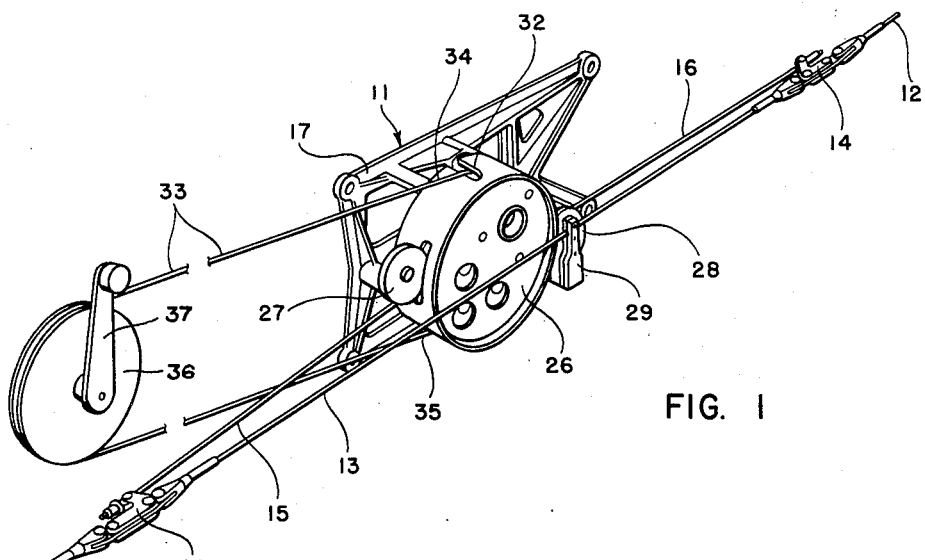
Figure 1 is a perspective view of the locking device and of a suitable operating means therefor.
Figure 2:
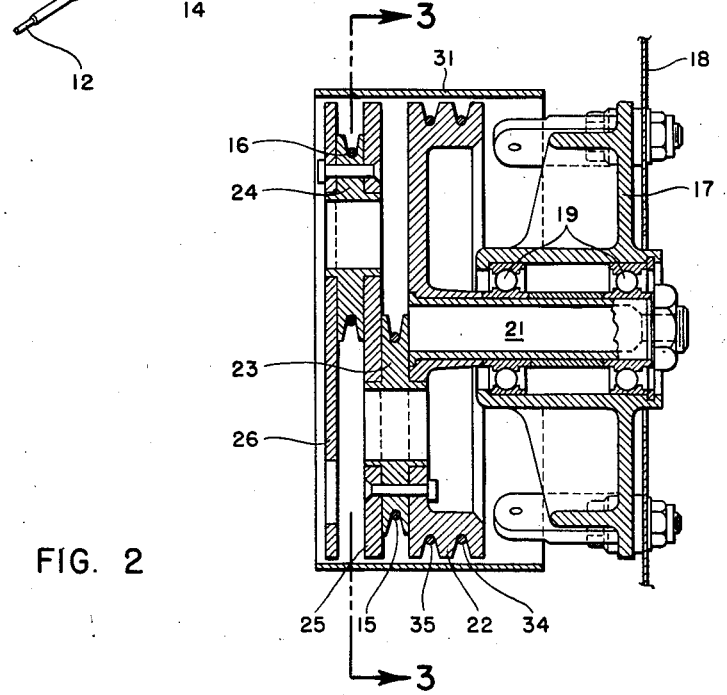
Figure 2 is a diametrical sectional view of the locking unit.

In Figure 1 the lock unit, indicated generally at 11, is shown as applied to one span of a runaround type of control cable 12, such as may be employed to connect a pilot's control element with the aircraft ailerons, for example. The span of cable 12 is completed by a cable section 13, joined thereto by fittings 14 which also connect to ends of locking cables 15 and 16 that extend into the unit 11. It will be understood that cables 15 and 16 may be connected with other types of systems to be locked against reciprocating movements: for example, the parts 12, 13 and 14 may form a single rigid element constituting a link in a push-pull rod type of control system. It will also be understood that the elements herein referred to as cables may be any type of chain, rope, wire or the like, which has sufficient flexibility and strength for the intended purpose.

The unit 11 includes a support 17 attached by suitable means to the aircraft structure 18 and provided with bearings 19 journalling the shaft portion 21 of a rotatable assembly. This assembly comprises the shaft portion 21, a drum 22 and axially spaced winding elements 23 and 24 for cables 15 and 16, respectively. Elements 23 and 24 may comprise pulleys so arranged in opposite eccentricity to the axis of shaft 21 that the cable engaging surface of each lies entirely to one side of that axis. For convenience of production the pulley or cable winding elements are separately formed, element 23 being secured between drum 22 and a plate 25, and element 24 being secured between plate 25 and another plate 26. However, if desired the parts 21, 22, 23 and 24 may be formed integrally.

The end of cable 15 is anchored to element 23 and the end of cable 16 is similarly anchored to element 24, the cables being guided to the rotatable assembly from diametrically opposite sides thereof by sheaves 27 and 28 mounted on extensions of the support 17. At least one of the sheave mounting extensions may be formed, as indicated at 29, to constitute a guide for cable section 13. Also carried by the support 17 is a guard or shield 31 which extends around the rotatable assembly and is provided with slots 32 for passing a lock operating cable 33 whose end portions 34 and 35 are anchored to the drum 22 and are at least partially wound around the drum periphery in grooves provided therein.

The lock operating cable 33 may extend to a suitable actuator, preferably disposed in the pilot's cabin of the aircraft. For example the cable may be wound around a rotatably mounted drum or pulley 36 having a crank 37 by the turning of which the cable 33 may be operated to turn the drum 22, and the assembly rotatable therewith, in either direction, to lock or unlock the control system. Obviously other means may be provided to operate the rotatable assembly: for example if the unit 11 is in a location accessible to the operator, a crank such as 37 may be secured directly to the assembly which comprises the elements 23 and 24 and shaft 21.

Figure 3:
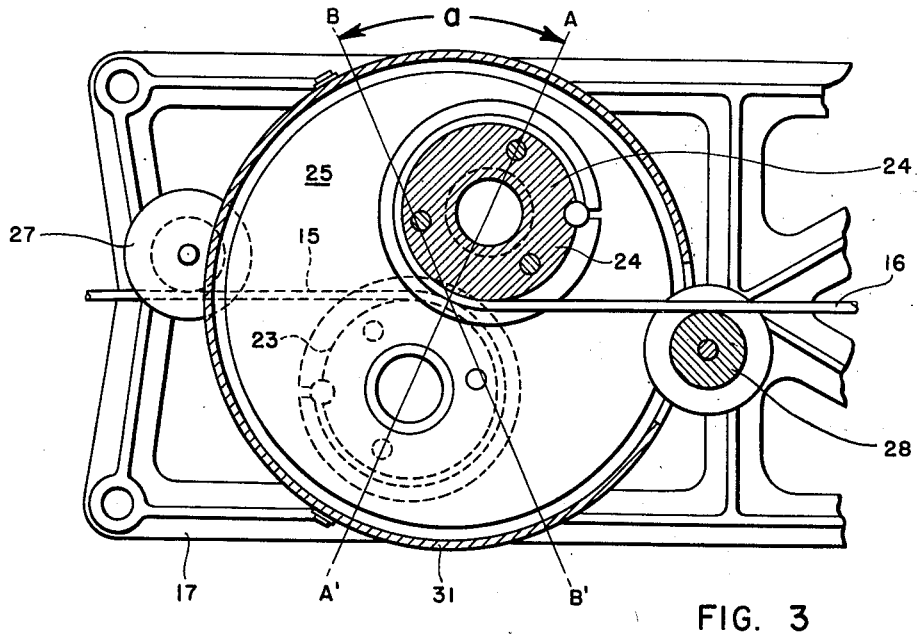
Figures 3 and 4 are sectional views taken along the plane indicated by line 3—3 in Figure 2 through the locking device when in locked and unlocked conditions, respectively.

To enable proper locking of the control system, the locking cables 15 and 16 are substantially taut and are at least partially wound around the cable winding elements 23 and 24 when the rotatable assembly is in such position that pull on either cable will tend to rotate the assembly to further wind the cable on elements 23 and 24. Such position is shown in Figure 3, wherein the assembly 21, 23, 24 has been rotated clockwise by the operating means 37, 36, 33, 22 to the limit position thereof wherein cables 15 and 16 are substantially taut. In this position, a dead center position, pull on either cable can effect no clockwise movement of the rotatable assembly. Therefore, in this position, the lock is applied and the control system 12, 13, 12 can be moved in neither direction.

Figure 4:
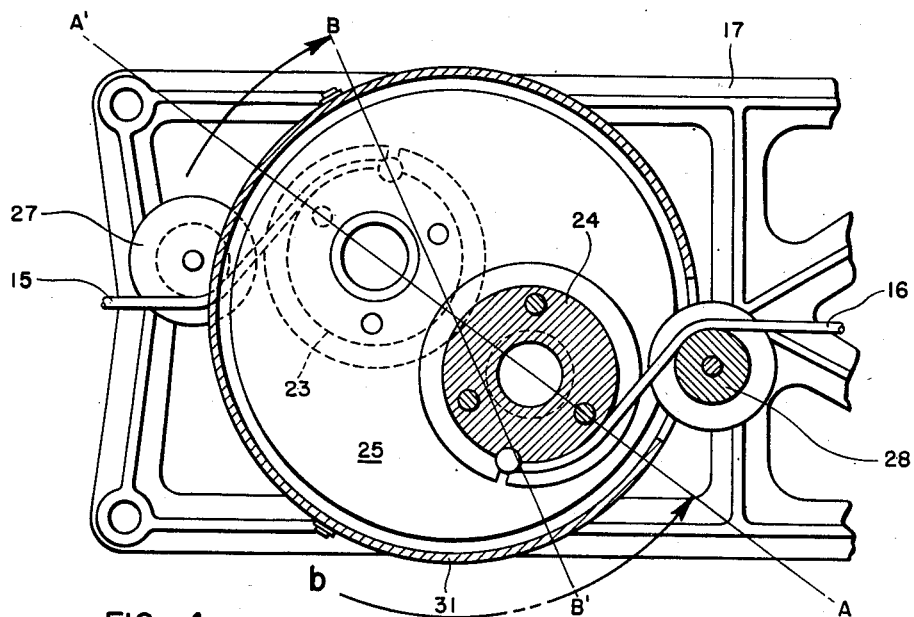

To release the lock, the rotatable assembly is moved counterclockwise, to the position shown in Figure 4, for example. Such movement allows cables 15, 16 to unwind from the elements 23, 24, and brings the rotatable assembly into such position that pull on either cable will urge further counterclockwise movement of the assembly to further unwind cables 15, 16. In this manner sufficient slack is provided in the cables so that the control system 12, 13, 12 may be freely moved in either direction throughout its operating range. The diameters of the elements 23, 24 should, of course, be made sufficient to accommodate the desired range of movement of the control system.

It will be noted that the positions of the rotatable assembly for locking or for lock release, are not critical. It will be seen that the lock will be applied in any position of the rotatable assembly in which pull on cable 15 (or on cable 16) will rotate the assembly in a direction, clockwise as the parts appear in Figures 3 and 4, which will result in the cables winding upon elements 23 and 24. The lock will be released in any position of rotation of the rotatable assembly in which pull on either cable will rotate the assembly in the opposite direction, to unwind the cables from the elements 23 and 24, i. e. in a counterclockwise direction as the parts appear in Figures 3 and 4. In the illustrated example, the line A—A' in Figures 3 and 4 represents a plane passing first through the axis of element 24 and then through the axis of element 23, and the plane B—B' represents the approximate location of the transition point between locked and unlocked positions of the rotatable assembly. This transition point, which may be located exactly by trial for a lock assembly of any particular size and cable diameter, is the neutral position of rotation wherein a pull on either or both of the cables 15 and 16 will cause no rotation of the rotatable assembly in either direction. As showing the non-critical nature of the positions in which the device is locked or unlocked, it is pointed out that the lock will be applied upon any substantial departure, in a clockwise direction, of plane A—A', from a fixed reference plane B—B'; and the lock will be released upon any substantial departure of plane A—A' in a counterclockwise direction from the plane B—B'. The angular range for locking is indicated in Figure 3 at $a$ and the range for unlocking at $b$ in Figure 4.

In applying the lock the rotatable assembly will normally be rotated until the cables 15, 16 are taut; but to release the lock the assembly need be rotated only sufficiently to effect release, and thereafter normal movements of the control system, by pulling on one or the other of cables 15, 16 will further rotate the assembly in a counterclockwise direction as the parts are viewed in Figure 4.

It will be understood that full locking movement of the rotatable assembly will always move the control system to a predetermined position, if it is not already in such position. This position of the control system, which may be predetermined by adjusting cables 15, 16 at connection fittings 14, is preferably the neutral position of the control system. In the event it is desired to lock a system in one limit position thereof, so that only one locking cable, such as 15 or 16, is needed, it will be apparent that the other locking cable and the winding element therefor can be omitted.

It will be understood further that the device herein illustrated and described is merely a preferred embodiment of the inventive principles involved, and that these principles may be otherwise embodied without departing from the spirit of the invention or from the scope of the appended claims.

I claim:

1. In a device for locking a control system, a pair of cables each having one end connected to the system for movement therewith, a rotatable member having affixed thereto a pair of cable winding elements disposed in substantially opposed eccentricity to the axis of rotation of said member, each element being so arranged that said axis lies outside of the winding periphery of the element upon which cable is wound, the opposite ends of the cables being anchored to said elements, each cable being at least partially wound around one of said elements and the cables being substantially taut in such a position of the member that pull on either cable will urge rotation of the member in a direction to further wind the cables on said elements.

2. In combination with a control system, a locking device comprising a pair of cables each having one end connected to the system for movement therewith, a lock support, a member mounted for rotation on the support and having affixed thereto a pair of cable winding elements, guide means for the cables carried by the support for guiding the cables to said elements from predetermined substantially diametrically opposite sides of the axis of rotation of said member, each of said elements being so arranged that said axis lies outside of the winding periphery of the element upon which cable is wound, each cable being at least partially wound around the one of said elements to which it is anchored and the cables being substantially taut in such position of the member that pull on either cable will urge rotation of the member in a direction to further wind the cables on said elements, and means for rotating the member in either direction whereby it may be moved from said position toward an unlocked position wherein pull on either cable will urge rotation of the member in a direction to unwind the cables from said elements.

3. In combination with a control system, a locking device comprising a cable having one end connected to the system for movement therewith, a lock support, a lock member mounted for rotation on the support and having affixed thereto a cable winding element, the periphery of said element upon which cable is wound being disposed entirely to one side of the axis of rotation of the member and the opposite end of the cable being anchored to said element, guide means carried by the support for guiding the cable to said element in predetermined relation to said axis, the cable being at least partially wound around said element and being taut in such position of the member that pull on the cable will urge rotation of the member in a direction to further wind the cable on the element, and means for rotating the member in either direction whereby it may be moved from said position toward an unlocked position wherein pull on the cable will urge rotation of the member in a direction to unwind the cable from the element.

4. In combination with a control system, a locking device comprising a pair of cables each having one end connected to the system for movement therewith, a rotatable drum having affixed thereto a pair of cable winding elements whose cable winding peripheries are disposed, in their entireties, at opposite sides of the drum axis of rotation, the opposite ends of the cables being anchored to said elements, each cable being at least partially wound around the one of said elements to which it is anchored and the cables being substantially taut in such position of the drum that pull on either cable will urge rotation of the drum in a direction to further wind the cables on said elements, and a lock control cable engaged with the drum for rotating the latter between said position and an unlocked position wherein slack is provided in said pair of cables to allow movement of the control system.

5. In combination with a control system, a locking device comprising a cable having one end connected to the system for movement therewith, a rotatable drum having affixed thereto a cable winding element whose cable winding periphery is disposed entirely to one side of the drum axis of rotation, the opposite end of the cable being anchored to the element, the cable being at least partially wound around the element and being taut in such position of the drum that pull on the cable will urge rotation of the drum in a direction to further wind the cable or said element, and a lock control cable engaged with the drum for rotating the latter between said position and an unlocked position wherein slack is provided in the first mentioned cable to allow movement of the control system.

6. In combination with a control system, a locking device comprising a pair of cables each having one end connected to the system for movement therewith, a member mounted for rotation and having a pair of cable winding elements whose cable winding peripheries are disposed, in their entireties, at opposite sides of the axis of rotation of the member, means for guiding the cables to the elements from substantially diametrically opposite sides of said axis, the cables being anchored at their opposite ends to said elements, and said elements having the cable engaging faces thereof axially spaced whereby each cable may be wound upon or unwound from the element to which it is attached upon rotational movement of the member.

7. In a cable locking device, a support, a member mounted for rotation on the support and said member having affixed thereto a pair of cable winding elements disposed at opposite sides of the axis of rotation of the member, the axis of rotation of said member lying outside of the periphery on which cable is wound of each of said winding elements, said elements being disposed in substantially parallel planes so that a separate cable may be at least partially wound around each of them, each element having means for anchoring such cable, and means on the support for guiding such cables from substantially diametrically opposed directions to the element.

HENRY H. DRUMM.

REFERENCES CITED

The following references are of record in the file of this patent:

UNITED STATES PATENTS

| Number | Name | Date |
|---|---|---|
| 614,581 | Shown | Nov. 22, 1898 |
| 905,135 | Balloco | Dec. 1, 1908 |
| 2,080,131 | Harper | May 11, 1937 |
| 2,097,048 | Statler | Oct. 26, 1937 |
| 2,178,066 | Clark | Oct. 31, 1939 |